United States Patent [19]

Shimatani et al.

[11] Patent Number: 5,434,250
[45] Date of Patent: Jul. 18, 1995

[54] PROCESS FOR MANUFACTURING HIGH α-LACTALBUMIN CONTENT COMPOSITION

[75] Inventors: Masaharu Shimatani, Sayama; Yukio Uchida, Tokorozawa; Ichirou Matsuno, Kawagoe; Makihiro Sugawara, Kawagoe; Taku Nakano, Kawagoe, all of Japan

[73] Assignee: Snow Brand Milk Products Co., Ltd., Hokkaido, Japan

[21] Appl. No.: 231,984

[22] Filed: Apr. 21, 1994

Related U.S. Application Data

[63] Continuation of Ser. No. 820,369, Jan. 14, 1992, abandoned.

[30] Foreign Application Priority Data

Jan. 21, 1991 [JP] Japan .................... 3-019114

[51] Int. Cl.$^6$ .................... C07K 15/14; A61K 39/395
[52] U.S. Cl. .................... 530/366; 530/306; 530/333; 530/332; 435/68.1
[58] Field of Search ............. 530/366, 386, 332, 333; 435/68.1

[56] References Cited

U.S. PATENT DOCUMENTS

| | | | |
|---|---|---|---|
| 2,606,181 | 8/1952 | Pratt et al. | 530/833 |
| 4,834,974 | 5/1989 | Stott et al. | 530/833 |
| 5,278,288 | 1/1994 | Kawasaki et al. | 530/361 |
| 5,280,107 | 1/1994 | Kawasaki et al. | 530/361 |

FOREIGN PATENT DOCUMENTS

| | | |
|---|---|---|
| 0320152A2 | 6/1989 | European Pat. Off. . |
| 321605 | 6/1989 | European Pat. Off. . |
| 398802 | 11/1990 | European Pat. Off. . |
| 2487642 | 5/1982 | France . |
| 1313085 | 7/1971 | United Kingdom . |
| 2179947 | 3/1987 | United Kingdom . |

OTHER PUBLICATIONS

Ayers, J. et al., "Whey Protein Recovery Using Indion S, An Industrial Ion Exhanger for Proteins," *New Zealand Journal of Dairy Science and Technology* 21:21–35, 1986.

Skudder, "Evaluation of a Porous Silica–Based Ion-Exchange Medium for the Production of Protein Fractions from Rennet– and Acid–Whey," *Journal of Dairy Research* 59:167–181, 1985.

*Primary Examiner*—Howard E. Schain
*Assistant Examiner*—P. Lynn Touzeau
*Attorney, Agent, or Firm*—Seed and Berry

[57] ABSTRACT

The present invention relates to a process for manufacturing a composition highly containing α-lactalbmin. This process comprises adjusting, to pH of 2–4 or 5 or higher, cheese whey, acid casein whey or rennet casein whey; contacting the whey with an ion exchanger, to produce an exchanger-passed solution; and then, concentrating and/or desalting the exchanger-passed solution, if necessary after the exchanger-passed solution is adjusted to a pH of 4 or lower. According to the present process, it is possible to efficiently produce a high α-lactalumin content composition at low cost and in a simple and easy manner on an industrial scale. The resultant high α-lactalumin content composition can be used for food materials and medical materials.

8 Claims, No Drawings

PROCESS FOR MANUFACTURING HIGH α-LACTALBUMIN CONTENT COMPOSITION

CROSS-REFERENCE TO RELATED APPLICATION

This application is a continuation of U.S. application Ser. No. 07/820,369, filed Jan. 14, 1992, now abandoned.

TECHNICAL FIELD

The present invention relates to a process for manufacturing a composition highly containing α-lactalbmin from milk whey.

BACKGROUND OF THE INVENTION

Since whey protein is high in nutrition value and protein utilization efficiency as compared with casein and soybean protein, it is known that whey protein is used as a substituent for breast milk or a protein source for nutritive composition. In particular, β-lactoglobulin (hereinafter referred to as "β-Lg"), which is a main component of whey protein in milk, is not present in breast milk and acts as an allergen for infantile allergy. Therefore, when whey protein is used as a substituent for breast milk, it is recommended that β-Lg be reduced or a material having a high content of α-lactalbmin (hereinafter referred to as "α-La") be used.

Up to this date, whey, a by-product in the manufacture of cheese or casein, is used in food as it is or in various forms, for example, in the form of low lactose whey wherein lactose is removed from whey, in the form of desalted whey produced by treating whey with various desalting devices, or in the form of whey protein concentrated (hereinafter referred to as "WPC") produced by treating whey with ultrafilters. On the other hand, as a process for fractionating whey protein contained in whey into individual components, there has been proposed a process for reducing β-Lg or a process for manufacturing a high α-La content composition.

As a process for separating and recovering a high α-La content fraction, there have been proposed various processes such as those described by Kuwata et al. (J. Food Sci., 50 (1985), R. J. Pearce (Aust. J. Dairy Technol., 42 (1987) and J. L. Maubois et al. (Japanese Unexamined Patent Published Application (hereinafter referred to as "J. P. Kokai") Sho No. 56-36494). These processes use whey as a starting material and utilize the difference in physical and/or chemical properties of various kinds of whey proteins. However, these processes have various drawbacks in that their steps are complicated; they are high energy consuming; they have low recovery; and they cause irreversible change of proteins. Therefore, they have not been accepted as an industrially practicable method.

As a process for recovering whey protein at a high concentration, there have been proposed processes using an ion exchanger as described in J. N. de Wit et al. (Neth. Milk Dairy J. 40 (1986)) and J. S. Ayers et al. (New Zealand J. Dairy Sci. and Tech., 21 (1986)). However, in these processes, at most the solution, which has passed through an ion exchanger (hereinafter referred to as "exchanger-passed solution") as a by-product, is merely utilized for the production of lactose and there has not been proposed processes for highly utilizing whey protein contained in the ion exchanger-passed solution.

SUMMARY OF THE INVENTION

The object of the present invention is to provide a process for efficiently separating and recovering α-La from cheese whey, acid casein whey or rennet casein whey.

The present inventors have made intensive studies for attaining the above object and, as a result, have found that this object can be attained by adjusting cheese whey, acid casein whey or rennet casein whey to a pH of 2–4 or 5 or higher; contacting the whey with an ion exchanger, to produce an exchanger-passed solution; and then, concentrating and/or desalting the exchanger-passed solution, if necessary after the exchanger-passed solution is adjusted to a pH of 4 or lower. Preferably, the exchanger-passed solution is concentrated and crystallized to remove lactose. Further preferably, the exchanger-passed solution is dried and changed into powder, to produce a composition having a high α-La content. Further, it is preferable that the exchanger-passed solution and/or a mother liquor after lactose has been removed therefrom be adjusted to a pH below 4 and then ultrafiltrated using an ultrafiltration membrane having a cutoff molecular weight of 10,000 to 50,000 Dalton, to remove lactose and ash content while efficiently removing κ-casein glycomacropeptide (hereinafter referred to as "GMP") contained in cheese whey, whereby increasing α-La content.

DETAILED EXPLANATION OF THE INVENTION

Milk whey such as cheese whey, acid casein whey or rennet casein whey usable as a starting material in the present invention is a by-product obtained when cheese, acid casein or rennet casein is separated from milks such as cow milk, goat milk and sheep milk. Because a small amount of curd or fat often remains in milk whey, it is preferable that they be previously removed by a cream separator or clarifier. In order for milk whey proteins such as β-Lg to be efficiently adsorbed to an ion exchanger, the whey may be previously concentrated with an ultrafiltration device. Further, the whey may be previously desalted with an electric dialyzer and/or an ion exchange resin.

As an ion exchanger, any kind of ion exchangers can be used, which include inorganic ion exchangers and organic ion exchangers, including anion exchangers or cation exchangers. Anion exchangers or cation exchangers may be used depending on the pH of the whey. In case where the anion exchangers are used, the pH is adjusted to 5 or higher. As materials for adjusting the pH, any kind of materials may be used. For example, they include alkalis such as sodium hydroxide, potassium hydroxide, calcium hydroxide, potassium carbonate, sodium citrate, etc. Alternatively, desalted whey, which has been desalted with an ion exchange resin and which has a pH of about 5 to 12, may be used for adjusting the pH. In the whey which has been adjusted to a pH of 5 or higher, most part of the whey protein is negatively charged. When this whey is contacted with the anion exchanger, β-Lg, a main component, is selectively adsorbed to the ion exchanger as compared with α-La. As a result, α-La and part of GMP are separately recovered as an exchanger-passed solution.

In case where a cation exchanger is used, the pH of the whey is adjusted to 2 to 4. As materials for adjusting the pH, any kind of materials may be used. For example, they include an acid such as hydrochloric acid, sulfuric acid, acetic acid, lactic acid and citric acid. The desalted whey, which has been desalted at pH of about 1 to 4, may be used for adjusting the pH. In the whey which has been adjusted to a pH of 2 to 4, most part of the whey protein is positively charged, while GMP is negatively charged. When this whey is contacted with a cation exchanger, β-Lg, a main component, is selectively adsorbed to the ion exchanger as compared with α-La. Consequently, α-La and most part of GMP are separately recovered as an exchanger-passed solution.

As techniques for causing whey protein to be adsorbed to the ion exchanger, there are known techniques such as those as described by J. N. de Wit et al. and J. S. Ayers et al. as stated in the above. These techniques use an anion exchanger having an ion exchange group such as a quaternary methylammonium group (QMA) or a diethylaminoethyl group, and a cation exchanger having an ion exchange group such as a carboxymethyl group or a sulfonate group. These techniques are employed to prepare whey protein isolate (WPI) by causing whey protein to be adsorbed to the ion exchanger. In these techniques, the exchanger-passed solution is merely used as a deproteinized whey to prepare lactose. In addition, there is no consideration for efficient utilization of α-La in the ion exchanger-passed solution. The present inventors have found that by subjecting whey to an ion exchanger after the pH adjustment thereof, α-La is caused to be contained in the exchanger-passed solution and is efficiently separated and recovered. The exchanger-passed solution thus obtained can be used as a high α-La content composition as it is. Alternatively, the solution may be concentrated and/or desalted or, if necessary, dried and changed into powder. In addition, the exchanger-passed solution can be concentrated and crystallized to remove lactose and form a mother liquor, which then may be used as a high α-La content composition. The concentration may be made by evaporator. The crystallization may be made by cooling or by addition of a seed crystal. In order to obtain a much higher α-La content composition, it is preferable that before the exchanger-passed solution or mother liquor or the mixture thereof is concentrated or desalted, they should be adjusted to a pH of 4 or lower. The concentration may be made by vacuum or ultrafiltration. The desalting may be made by electric dialysis, ion exchange, ultrafiltration or diafiltration. The diafiltration is a technique for further increasing the protein content, wherein a liquid, which has been concentrated to some extent, is ultrafiltered while simultaneously water is added thereto and a passing solution is withdrawn. It is preferable that the ultrafiltration be made using an ultrafiltration membrane having a cutoff moleculaor weight of 10,000 to 50,000 Dalton. When the cutoff molecular weight of the ultrafiltration membrane is lower than 10,000 Dalton, GMP is difficult to be passed and fractionated. When the cutoff molecular weight of the ultrafiltration membrane is larger than 50,000 Dalton, α-La is passed together with GMP and therefore it is practically difficult to conduct the fractionation. In other words, GMP is present as a monomer (MW: 9,000) at a pH of 4 or lower, while it is present as a polymer (MW: 40,000 to 50,000) at a pH above 4 Therefore, it is preferable that the ultrafiltration membrane having a cutoff molecular weight within the range above be used in order to efficiently remove GMP from the exchanger-passed solution and to enhance the α-La content.

According to the present invention, it is possible to produce a composition having a high α-La content at a low cost and in a simple manner on an industrial scale, by contacting milk whey with an ion exchanger after the pH of the whey is adjusted. The high α-La content composition thus obtained can be utilized as food materials or medical materials and therefore is very useful, industrially.

EXAMPLES

The present invention will be further explained in detail by reference to the following nonlimitative examples.

Reference Example 1

100 kg of Cheddar cheese whey, which had been adjusted to a pH of 3.5 by hydrochloric acid, was mixed with 3 liters of Indion S3 by Phoenix Chemicals (Cellulose-Sulphopropyl, Carboxymethyl cellulose) as a cation exchanger, slowly stirred for 20 hours, and then separated with a filter into an exchanger-passed solution and the cation exchanger. The exchanger-passed solution thus obtained (99.2 kg) contained 5.5 g/100 g of a solid content, 0.6 g/100 g of protein, and 0.2 g/100 g of α-La. α-La was quantitatively determined according to the electrophoresis (Laemmli method) as described in Laemmli V. K.; Nature, 227, 680 (1970).

Reference Example 2

100 kg of rennet casein whey, which had been adjusted to a pH of 6.5 with sodium hydroxide, was passed through a column filled with 4 liters of Sepharosil QMA (Silica-QMA) manufactured by Rhone Poulenic as an anion exchanger at an SV of 2.5 for 10 hours. The exchanger-passed solution (99.0 kg) contained 5.8 g/100 g of a solid content, 0.7 g/100 g of protein, and 0.4 g/100 g of α-La.

Reference Example 3

The exchanger-passed solution obtained in Reference Example 1 was concentrated to a solid content of 60% using an evaporator and then crystallized to remove lactose. A mother liquor (6.4 kg) obtained after the crystallized lactose was washed with water contained 35.0 g/100 g of a solid content, 9.0 g/100 g of protein, and 2.8 g/100 g of α-La.

Reference Example 4

The exchanger-passed solution obtained in Reference Example 2 was concentrated to a solid content of 55% using an evaporator and then crystallized to remove lactose. A mother liquor (8.6 kg) obtained after the crystallized lactose was washed with water contained 40.0 g/100 g of a solid content, 8.0 g/100 g of protein, and 4.5 g/100 g of α-La.

Example 1

The exchanger-passed solution obtained in Reference Example 2 was adjusted to a pH of 3.4 with hydrochloric acid and then ultrafiltrated using an ultrafiltration membrane having a cutoff molecular weight of 20,000 Dalton. The resultant concentrated solution was then desalted with diafiltration. The resultant desalted and concentrated solution (8 kg) contained 11.5 g/100 g of a solid content, 8.5 g/100 g of protein, and 4.2 g/100 g of α-La. This solution was further concentrated and dried according to the conventional manner to yield 0.90 kg of powder.

Example 2

5.6 kg of water was added to the mother liquor obtained in Reference Example 3. The resultant mixture was adjusted to a pH of 3.8 with citric acid and then ultrafiltrated using an ultrafiltration membrane having a cutoff molecular weight of 10,00 Dalton. The resultant concentrated solution was desalted by dialfiltration. The resultant desalted and concentrated solution (5 kg) contained 7.9 g/100 g of a solid content, 6.0 g/100 g of protein, and 3.5 g/100 g of α-La. This solution was further concentrated and dried according to the conventional manner to yield 400 g of powder.

Example 3

The exchanger-passed solution obtained in Reference Example 2 was adjusted to a pH of 6.4 with NaOH and then ultrafiltrated using an ultrafiltration membrane having a cutoff molecular weight of 50,000 Dalton. The resultant concentrated solution was then desalted with diafiltration using the same ultrafiltration membrane. The resultant desalted and concentrated solution (10 kg) contained 15.0 g/100 g of a solid content, 5.5 g/100 g of protein, and 1.9 g/100 g of α-La. This solution was further concentrated and dried according to the conventional manner to yield 1.45 kg of powder.

Example 4

5.6 kg of water was added to the mother liquor obtained in Reference Example 4. The resultant mixture was ultrafiltrated using an ultrafiltration membrane having a cutoff molecular weight of 2,000 Dalton. The resultant concentrated solution was desalted by diafiltration using the same ultrafiltration membrane. The resultant desalted and concentrated solution (8 kg) contained 16.7 g/100 g of a solid content, 10.0 g/100 g of protein, and 6.2 g/100 g of α-La. This solution was further concentrated and dried according to the conventional manner to yield 900 g of powder.

What is claimed is:

1. A process for concentrating α-lactalbumin comprising the steps of:
   (a) adjusting cheese whey, acid casein whey or rennet casein whey to a pH of 5 or higher;
   (b) contacting the whey with an anion exchanger, to produce an exchanger-passed solution;
   (c) adjusting the exchanger-passed solution to a pH of 4 or lower; and then
   (d) subjecting the exchanger-passed solution to ultrafiltration or diafiltration using a membrane having a cut-off molecular weight of 10.000–50,000, thereby separating the α-lactalbumin from κ-casein glycomacropeptide.

2. The process of claim 1, further comprising a step of concentrating and crystallizing the exchanger-passed solution from the step (b), to remove lactose therefrom and to yield a mother liquor.

3. The process of claim 2, further comprising a step of adding water to the mother liquor to prepare a diluted mother liquor and use the diluted mother liquor as the exchanger-passed solution of the step (c).

4. The process of claim 1, further comprising a step of drying and changing the exchanger-passed solution from the step (d), into powder.

5. A process for concentration α-lactalbumin comprising the steps of:
   (a) adjusting cheese whey, acid casein whey or rennet casein whey to a pH of 2–4;
   (b) contacting the whey with a cation exchanger, to produce an exchanger-passed solution;
   (c) adjusting the exchanger-passed solution to a pH 4 or lower; and then
   (d) subjecting the exchanger-passed solution to ultrafiltration or diafiltration using a membrane having a cut-off molecular weight of 10,000–50,000, thereby separating the α-lactalbumin from κ-casein glycomacropeptide.

6. The process of claim 5, further comprising a step of drying and changing the exchanger-passed solution from the step (c), into powder.

7. The process of claim 5, further comprising a step of concentrating and crystallizing the exchanger-passed solution after the step (b) and before the step (c), to remove lactose therefrom and yield a mother liquor.

8. The process of claim 7, further comprising a step of adding water to the mother liquor, to prepare a diluted mother liquor and then using the diluted mother liquor as the exchanger-passed solution of the step (c).

* * * * *